United States Patent

[11] 3,631,570

| | | |
|---|---|---|
| [72] | Inventor | David Coleman |
| | | 95 Cathedral Road, Cork, Eire, Ireland |
| [21] | Appl. No. | 77,842 |
| [22] | Filed | Oct. 5, 1970 |
| [45] | Patented | Jan. 4, 1972 |
| [32] | Priority | Oct. 17, 1969 |
| [33] | | Ireland |
| [31] | | 1425/69 |

[54] FASTENING DEVICE
10 Claims, 5 Drawing Figs.

[52] U.S. Cl. .................................................. 24/129
[51] Int. Cl. ............................................... F16g 11/00
[50] Field of Search ........................................ 24/129;
248/328, 68

[56] References Cited
UNITED STATES PATENTS
343,849  6/1886  Pond ............................ 24/129
2,273,136  2/1942  Orech ........................... 24/129
2,313,280  3/1943  Szego ........................... 24/129

Primary Examiner—Bernard A. Gelak
Attorney—Holcombe, Wetherill & Brisebois

ABSTRACT: A fastening device for string, rope, wire and the like consists of a rigid block, having three passages extending through it parallel to a pair of opposite faces of the block, with the axes of the passages coinciding adjacent the perimeter of the block, two of the passages are mutually at right angles and the third passage is between them and at 45° to them. At least three holes extend through the block with at least one of the holes communicating with the third passage. The passages serve to guide a flexible line passed through them and the holes permit a line to be rapidly connected to the block in a manner which enables the line to be quickly released.

PATENTED JAN 4 1972 3,631,570
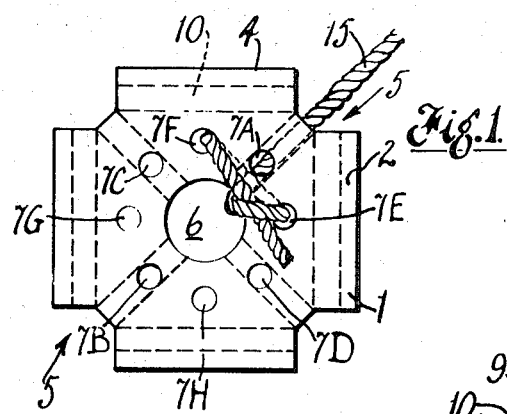
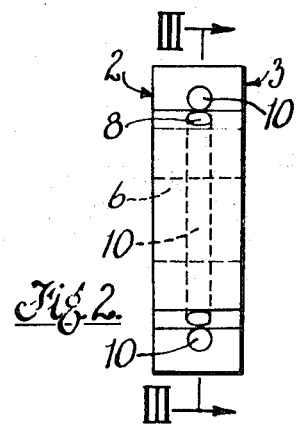
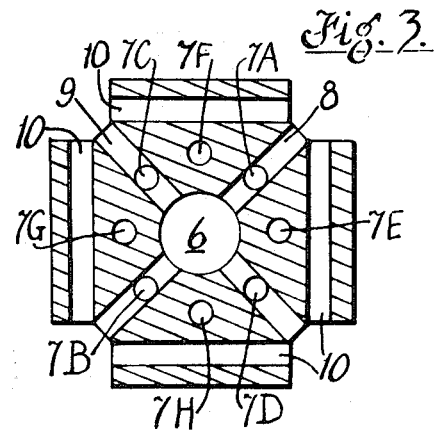
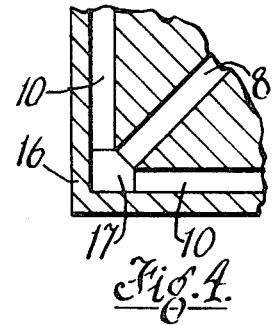
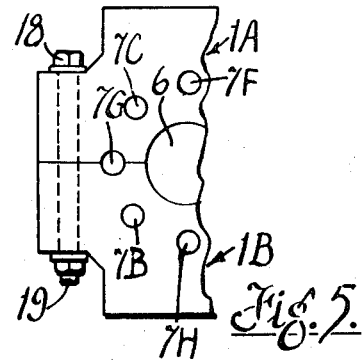

FASTENING DEVICE

This invention relates to a device for guiding flexible lines of string, rope, wire and the like and to which a line can readily be fastened in order to anchor the line to the device. The device is constructed in a manner which enables the line to be readily fastened to and unfastened from the device. In use, the device may have two or more lines attached thereto thereby connecting the lines together.

According to a first aspect of the present invention a fastening device comprises a block or rigid material having a pair of parallel spaced-apart opposite faces, three passages extending through the part of the body connecting said faces with the longitudinal axes of the passages arranged parallel to the planes of the faces and coinciding at or adjacent the perimeter of the body, the axes of two of the passages being mutually at right angles and with the axis of the third passage between and at 45° to the axes of the other passages and at least three holes extending through the body normal to the faces with at least one of the holes communicating with said third passage.

According to a second aspect of the invention a fastening device comprises a block of rigid material having a pair of substantially parallel spaced-apart faces, each face being square in plan, three passages extending through the part of the body connecting said faces with the longitudinal axes of the passages arranged parallel to the planes of the faces, two of the passages being arranged with their longitudinal axes parallel to a pair of adjacent sides of a face and the third passage being arranged with its longitudinal axis parallel to an imaginary line joining a pair of opposite corners of the face, the axes of said passages coinciding adjacent the perimeter of the body and at least three holes extending through the body normal to the faces with at least one of the holes communicating with the third passage.

The device has many uses, for example two or more devices may be used for guiding strings laid out on a building site. By passing the strings through the passages through the block the strings can be positioned so that a right angle or an angle of 45° extends between them. This is often required when sites are being laid out prior to excavation. A further use of the device is for the securement of ropes on a sailing boat. In a sailing boat it is often necessary to temporarily secure a rope and it is essential that the rope can quickly be unfastened. By passing the rope through at least three holes in the device the rope can be rigidly secured to the device but at the same time it can easily be unfastened from the device simply by removing the rope from the holes. If it is necessary to join two ropes together as for example to produce a quick splice between two ropes on a sailing boat, the ropes are secured to the device thereby connecting the two lengths of rope together. The device is so constructed that the ropes can quickly be unfastened from the device when the ropes are to be disconnected.

When the block has faces which are generally square in plan it is preferable that three further passages extend through the part of the body connecting the faces, the axes of two of the further passages are arranged parallel to the other pair of adjacent sides of the face and the axis of the other passage is arranged parallel to the imaginary line joining the other pair of opposite corners of the face. To assist the user to introduce the lines into the passages it is preferred for the corners of the block which include the corners of the faces to be cut away and the passages then extent to the perimeter of the block at the cutaway portions.

The block may be of any suitable rigid material but it is preferred for it to be either of plastic material, wood, or rubber.

In order that the invention may be more readily understood it will now be described, by way of example only, with reference to the accompanying drawings in which FIG. 1 is a plan view of the device in accordance with one embodiment of the invention, FIG. 2 is a side elevation of the device shown in FIG. 1, FIG. 3 is a section on the line X—X of FIG. 2, FIG. 4 is a section similar to that of FIG. 3 showing an alternative construction of the device, and FIG. 5 is a part plan view of a device made in two parts and held together by bolts.

Referring to FIGS. 1, 2 and 3 a block 1 of rigid material, for example plastics material has a pair of opposite faces 2 and 3 which are parallel and spaced apart by the thickness of the block. Each face has four edges 4 which are arranged as the sides of a square and the corners of the square are cut away as indicated by reference number 5 so that in plan each face is of cruciform shape. A central hole 6 extends through the block between the opposite faces and a plurality of further holes 7 are arranged around the central hole with their centers equidistant from the center of the hole 6. The holes 7A and 7B are arranged on a diagonal of the faces and the holes 7C and 7D are arranged on the other diagonal of the face.

A pair of passages 8 and 9 extend through the part of the block connecting said faces and the longitudinal axes of the passages are parallel to the planes of the faces 2 and 3. The passage are parallel to the diagonals of the faces 2 and 3 and start and terminate in the cutaway portions 5. The passage 8 is in communication with the holes 7A and 7B and the passage 9 is in communication with the holes 7C and 7D. Both passages are in communication with the central hole 6. Four further passages 10 are arranged with their longitudinal axes parallel to the planes of the faces 2 and 3 and project through the part of the block connecting the two faces. The longitudinal axes of these passages are arranged parallel to the edges of the faces 2 and 3 and the passages start and terminate in the cutaway portions 5. The axes of the passages 10 are mutually at right angles to each other and are at 45° to the axes of the passages 8 and 9.

In FIG. 1, a line 15 is shown attached to the device. To secure the line to the device it is simply necessary to pass the line through at least three of the holes. In FIG. 1 the end of the line to be secured to the device is passed through the passage 8 and upwardly normal to the plane of the paper through the central hole 6 it is then passed down through the hole 7E positioned between the holes 7A and 7D and it is then returned upwardly through the hole 7F positioned between holes 7A and 7C and passed beneath the loop extending between the holes 6 and 7E. If tension is applied to the line it simply serves to pull the loop between the hole 6 and 7E hard against the end portion of the line tucked beneath it thereby clamping the end portion of the line tighter against the face of the block. To unfasten the line from the block it is only necessary to lift the loop between the loops 6 and 7E sufficiently to withdraw the end of the line from beneath the loop. The end can then be pulled down through the hole 7F and up through the hole 7E allowing the line to be freed from the device by pulling it through the passage 8. Clearly several lines could be secured to the device simultaneously. The device itself may be either rigidly secured to a supporting structure as for example by screws or the device itself may be attached to a supporting structure by the line which is fastened to the device in the manner described above.

If it is desired to connect two lines which are arranged with their longitudinal axes coaxial the two lines are passed through opposite ends of one of the passages 8 or 9 and upwardly through the central hole 6 each line is then secured to the device in the manner described above and a firm connection is provided by the device between the two sections of line.

The device is useful for laying out lines or strings where parts of the strings are to be positioned relative to each other through certain angles. For example, if two lines are to be held parallel the lines may be passed through two of the parallel passages 10 and the device keeps the lines parallel. If however the lines are to be positioned at right angles to each other they are passed through two of the passages 10 which are arranged mutually normal. Again if one line is to be positioned at 45° to another line one of the lines is passed through one of the passages 10 and the other is passed through one of the passages 8 or 9.

FIG. 4 shows a device in which one of the corners of the block 16 is only partially cut away. The corner is cut away sufficiently to allow lines to be passed through the passages terminating at the corner but sufficient material remains to serve as an anchor point for the device. The part of the block remaining at the corner has an opening 17 extending therethrough to permit the device to be secured to a foundation as for example by passing a nail or screw through the opening 17.

FIG. 5 illustrates an embodiment of the device which is similar to that shown in FIGS. 1–3 except that the device is made in two parts 1A and 1B with the joint between the two parts extending horizontally through the diameter of the hole 6. The two parts are connected together by a pair of bolts extending through the passages 10. Each bolt has a nut associated with it and one nut 18 and one bolt 19 are shown in FIG. 5. The two parts of the device may be assembled around a wire passing through the hole 6 or through one or both of the holes 7E and 7G. The nuts and bolts serve to clamp the device to the wire or wires.

As mentioned above the device is manufactured from any suitable rigid material and the device may be of any desired color or combination of colors. It may be painted with a luminous paint if desired. The device may be of any convenient size bearing in mind the size of the lines to be passed through it or attached to it.

I claim:

1. A fastening device comprising a block of rigid material having a pair of parallel spaced-apart opposite faces, three passages extending through the part of the block connecting said faces with the longitudinal axes of the passages arranged parallel to the planes of the faces and coinciding adjacent the perimeter of the block, the axes of two of the passages being mutually at right angles and with the axis of the third passage between and at 45° to the axes of the other passages and at least three holes extending through the block normal to the faces with at least one of the holes communicating with said third passage.

2. A fastening device comprising a block of rigid material having a pair of substantially parallel spaced-apart faces, each face being square in plan, three passages extending through the part of the block connecting said faces with the longitudinal axes of the passages arranged parallel to the planes of the faces, two of the passages being arranged with their longitudinal axes parallel to a pair of adjacent sides of a face and the third passage being arranged with its longitudinal axis parallel to an imaginary line joining a pair of opposite corners of the face, the axes of said passages coinciding adjacent the perimeter of the block and at least three holes extending through the block normal to the faces with at least one of the holes communicating with the third passage.

3. A fastening device as claimed in claim 2 having three further passages extending through the part of the block connecting said faces, the axes of two of said further passages being arranged parallel to the other pair of adjacent sides of the face and the axis of the other passage being arranged parallel to the imaginary line joining the other pair of opposite corners of the face.

4. A fastening device as claimed in claim 3 in which the corners of the block which include the corners of the faces are cut away and the passages extend to the perimeter of the block at the cutaway portions.

5. A fastening device as claimed in claim 3, in which at least one corner of the block which includes a corner of the faces is partially cut away to expose the passages in the vicinity of the corner and the noncutaway portion serves as a support for the device.

6. A fastening device as claimed in claim 3 in which one of said holes communicates with both of the passages which extend parallel to the imaginary lines joining opposite corners of the face and each of these passages has two further holes in communication therewith.

7. A fastening device as claimed in claim 1 in which said hole which communicates with both of the passages is spaced equidistant from said other holes.

8. A fastening device as claimed in claim 1 in which the block is of plastics material.

9. A fastening device as claimed in claim 1 in which the block is of wood.

10. A fastening device as claimed in claim 1 in which the block is of rubber.

* * * * *